United States Patent
Liu et al.

(10) Patent No.: US 10,001,566 B2
(45) Date of Patent: Jun. 19, 2018

(54) DISTANCE FACTOR LEARNING DEVICE, DISTANCE FACTOR LEARNING METHOD AND CURRENT POSITION CALCULATING DEVICE

(71) Applicant: Clarion Co., Ltd., Saitama-shi, Saitama (JP)

(72) Inventors: Zhixing Liu, Tokyo (JP); Akihiro Kawabata, Koriyama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days. days.

(21) Appl. No.: 15/100,102

(22) PCT Filed: Jul. 2, 2014

(86) PCT No.: PCT/JP2014/067665
§ 371 (c)(1),
(2) Date: May 27, 2016

(87) PCT Pub. No.: WO2015/079731
PCT Pub. Date: Jun. 4, 2015

(65) Prior Publication Data
US 2017/0038474 A1 Feb. 9, 2017

(30) Foreign Application Priority Data
Nov. 29, 2013 (JP) .................................. 2013-248347

(51) Int. Cl.
*G01C 22/00* (2006.01)
*G01S 19/42* (2010.01)
*G01C 21/16* (2006.01)

(52) U.S. Cl.
CPC .......... *G01S 19/428* (2013.01); *G01C 21/165* (2013.01); *G01C 22/00* (2013.01)

(58) Field of Classification Search
None
See application file for complete search history.

(56) References Cited

U.S. PATENT DOCUMENTS 5,483,457 A * 1/1996 Shibata .................. G01C 21/28
701/472
5,686,925 A * 11/1997 Maeda .................... G01C 21/28
342/104

(Continued)

FOREIGN PATENT DOCUMENTS

JP 8-68653 A 3/1996
JP 9-507581 A 7/1997

(Continued)

OTHER PUBLICATIONS

International Search Report (PCT/ISA/210) issued in PCT Application No. PCT/JP2014/067665 dated Aug. 5, 2014, with English translation (four (4) pages).

(Continued)

*Primary Examiner* — Rami Khatib
(74) *Attorney, Agent, or Firm* — Crowell & Moring LLP

(57) ABSTRACT

A distance factor learning device includes: a first learner that updates a first estimated value for the distance factor and a first parameter, based upon a measurement quantity, which is calculated based upon the vehicle speed pulses and the GPS information, the first estimated value for the distance factor and the first parameter; a second learner that updates a second estimate a value for the distance factor and a second parameter, based upon the measurement quantity, which is calculated based upon the vehicle speed pulses and the GPS information, the second estimated value for the distance factor and the second parameter; a difference calculation unit that calculates a difference between the first estimated value and the second estimated value; and an arithmetic operation control unit that overwrites the first parameter and the first estimated value at the first learner with the second parameter and the second estimated value at the second learner when the difference between the first (Continued)

estimated value and the second estimated value, having been calculated, is equal to or greater than a predetermined value.

4 Claims, 3 Drawing Sheets

(56) References Cited

U.S. PATENT DOCUMENTS

| | | | | |
|---|---|---|---|---|
| 5,852,791 | A * | 12/1998 | Sato | G01C 21/30 340/988 |
| 5,890,092 | A * | 3/1999 | Kato | G01C 21/28 342/457 |
| 5,912,635 | A * | 6/1999 | Oshizawa | G01C 21/28 235/95 R |
| 6,029,111 | A | 2/2000 | Croyle | |
| 6,708,115 | B1 * | 3/2004 | Nagasaka | G01C 21/28 701/472 |
| 9,606,240 | B2 * | 3/2017 | Bonanni | G01S 19/47 |
| 2003/0204310 | A1 | 10/2003 | Tanaka et al. | |
| 2005/0102098 | A1 * | 5/2005 | Montealegre | G01C 21/32 701/533 |
| 2007/0233366 | A1 * | 10/2007 | Lin | G01C 21/30 701/408 |
| 2009/0138199 | A1 * | 5/2009 | Bonanni | G01C 21/28 701/472 |
| 2011/0208424 | A1 | 8/2011 | Hirsch et al. | |
| 2011/0208496 | A1 * | 8/2011 | Bando | G01S 19/49 703/2 |
| 2017/0158213 | A1 * | 6/2017 | Mathews | B61L 25/02 |

FOREIGN PATENT DOCUMENTS

| | | |
|---|---|---|
| JP | 2000-28380 A | 1/2000 |
| JP | 2003-322544 A | 11/2003 |
| JP | 2012-58087 A | 3/2012 |
| WO | WO 96/12973 A1 | 5/1996 |

OTHER PUBLICATIONS

Extended European Search Report issued in counterpart European Application No. 14865219.1 dated Sep. 15, 2017 (8 pages).

Japanese-Language Office Action issued in counterpart Japanese Application No. 2015-550582 dated Feb. 6, 2018 with English translation (five (5) pages).

\* cited by examiner

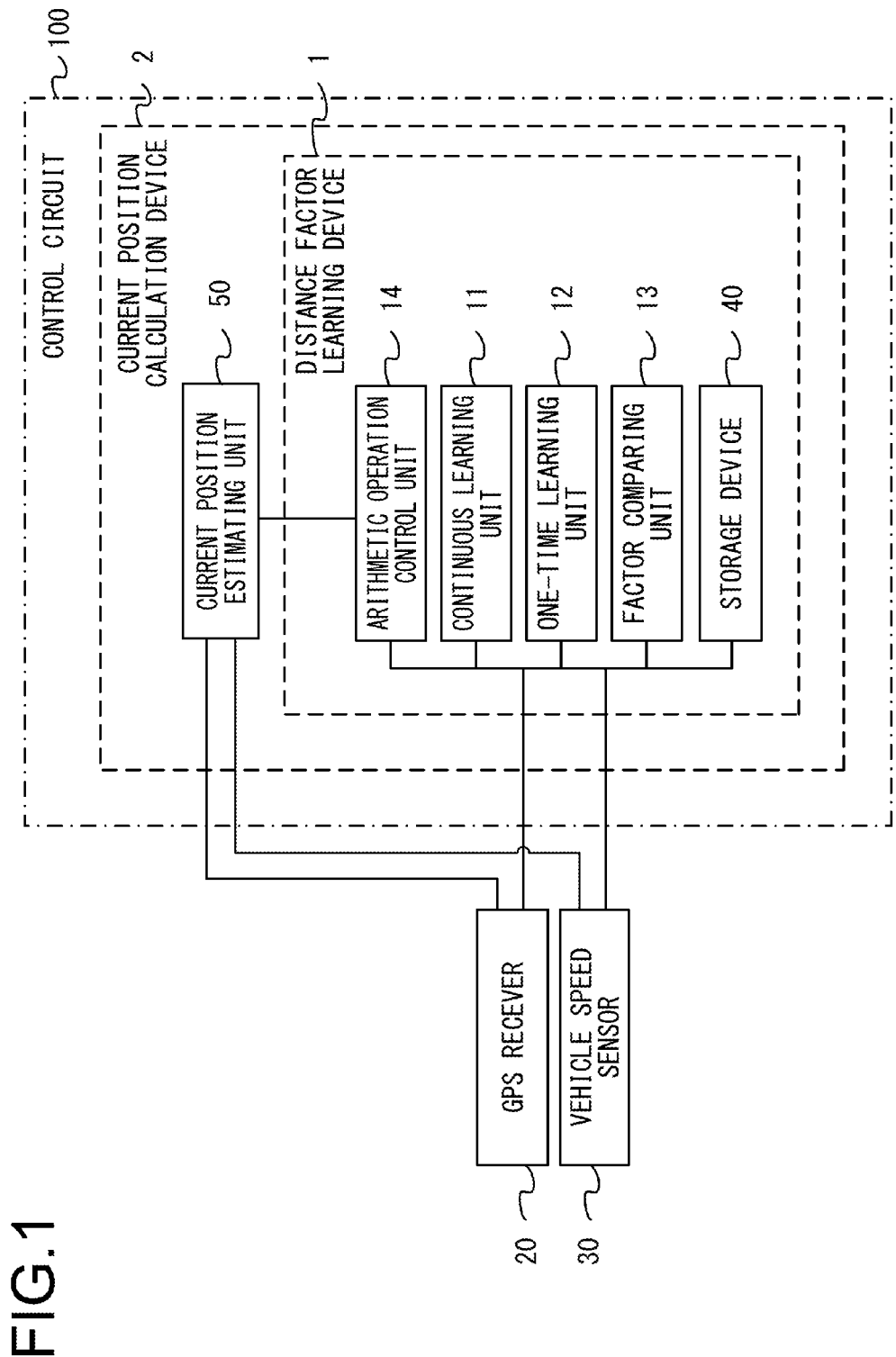

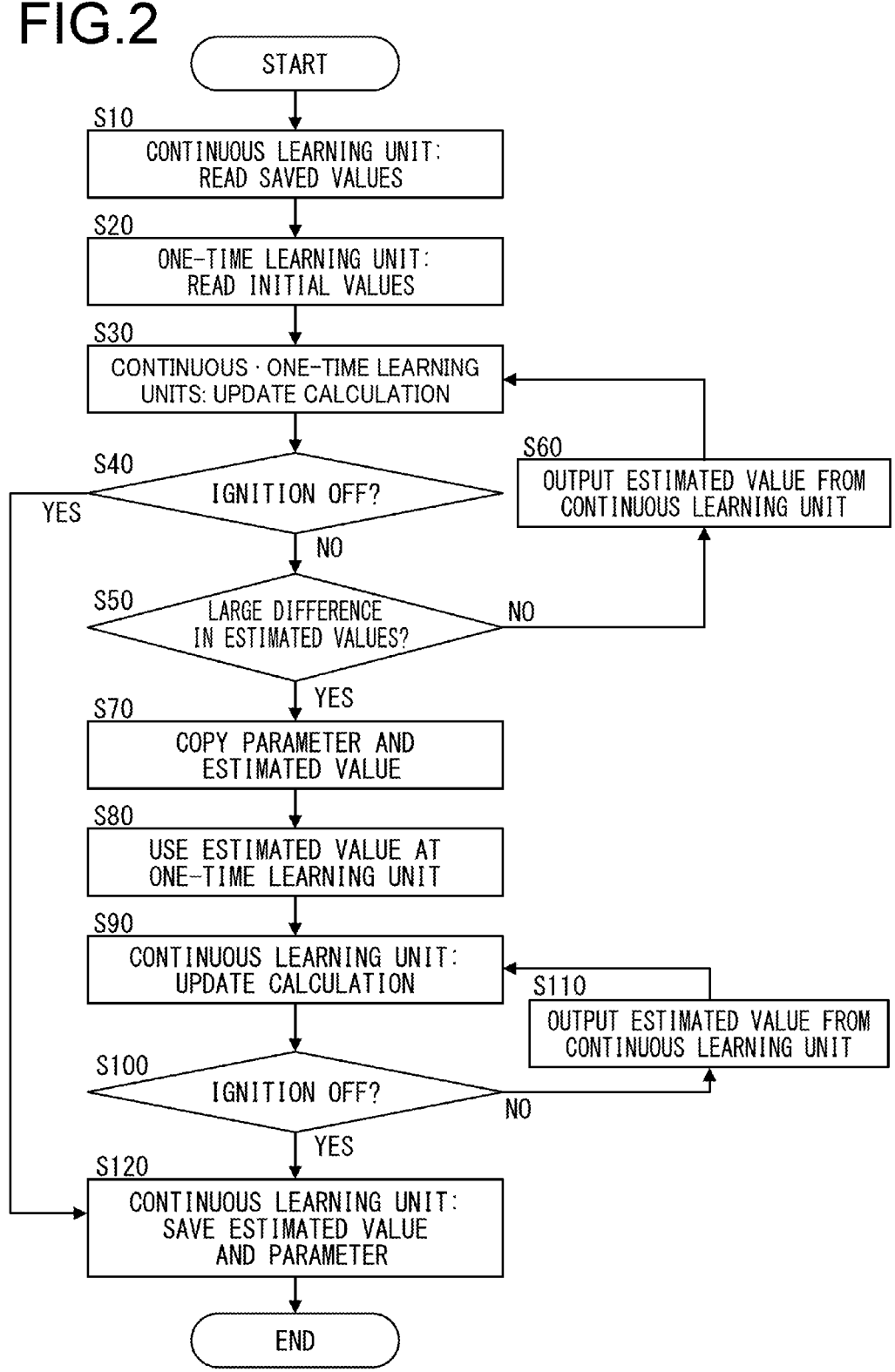

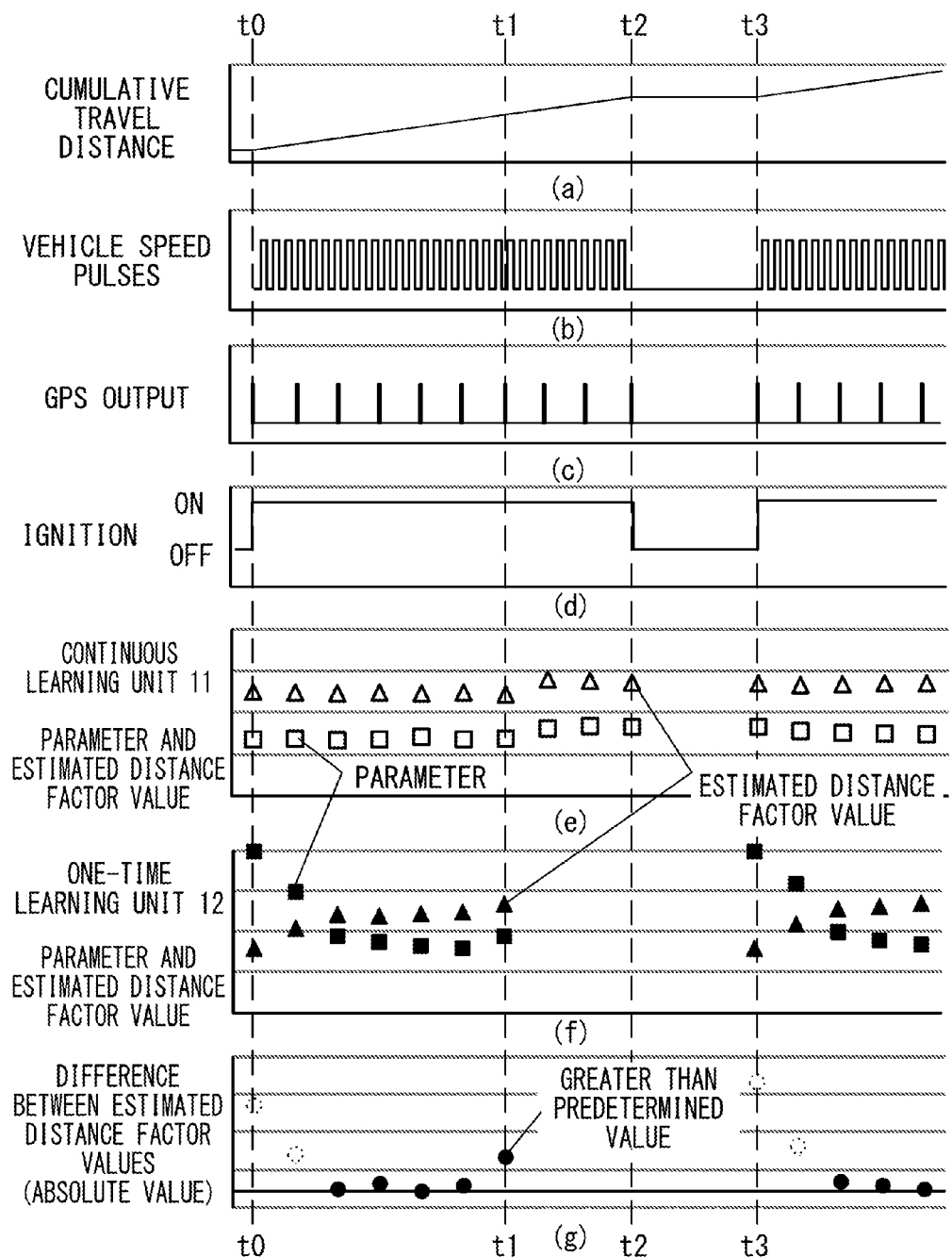

DISTANCE FACTOR LEARNING DEVICE, DISTANCE FACTOR LEARNING METHOD AND CURRENT POSITION CALCULATING DEVICE

TECHNICAL FIELD

The present invention relates to a distance factor learning device, a distance factor learning method and a current position calculation device, which enable calculation of a travel distance based upon the rotation rate of a rotating body.

BACKGROUND ART

While the position of a mobile object can be calculated based upon GPS signals, the mobile object position may need to be updated while no GPS signals are being received, e.g., while the mobile object is traveling in a shielded condition. This issue is addressed by determining in advance a distance factor indicating a relationship between the tire rotation rate and the travel distance and calculating the travel distance based upon information pertaining to the tire rotation rate, which is available over shorter cycles, compared to GPS signals. However, the distance factor is bound to change as the tires become worn, the tire air pressure changes or the tires are replaced, and furthermore, the sensor input can never be completely error-free. PTL1 discloses a method whereby the difference between a saved distance factor and a newly calculated distance factor is saved as error information if the difference is represented by a value equal to or greater than a specific value and upon detecting error information a predetermined number of times or more, a new distance factor is calculated based upon the error information.

CITATION LIST

Patent Literature

PTL1: Japanese Laid Open Patent Publication No. 2003-322544

SUMMARY OF INVENTION

Technical Problem

However, it is difficult to estimate a distance factor while assuring both good response and stability in limited storage space.

Solution to Problem

According to the 1st aspect of the present invention, a distance factor learning device that calculates an estimated value for a distance factor based upon a distance between a plurality of current positions obtained from GPS information, a number of vehicle speed pulses obtained while the distance is traveled, and a parameter which is a error index of the estimated value for the distance factor, and that is used for a current position calculation device that calculates a current position based upon the estimated value for the distance factor, comprises: a first learner that updates a first estimated value for the distance factor and a first parameter, based upon a measurement quantity, which is calculated based upon the vehicle speed pulses and the GPS information, the first estimated value for the distance factor and the first parameter; a second learner that updates a second estimate a value for the distance factor and a second parameter, based upon the measurement quantity, which is calculated based upon the vehicle speed pulses and the GPS information, the second estimated value for the distance factor and the second parameter; a difference calculation unit that calculates a difference between the first estimated value and the second estimated value; and an arithmetic operation control unit that overwrites the first parameter and the first estimated value at the first learner with the second parameter and the second estimated value at the second learner when the difference between the first estimated value and the second estimated value, having been calculated, is equal to or greater than a predetermined value.

According to the 2nd aspect of the present invention, it is preferred that in the distance factor learning device according to the 1st aspect, the distance factor learning device further comprises a storage unit in which the first estimated value and the first parameter calculated by the first learner are stored with predetermined first timing, wherein: the first learner, started up with predetermined second timing, reads, at startup, the first estimated value and the first parameter having been stored with the predetermined first timing and starts execution of update processing to update the first estimated value and the first parameter based upon the measurement quantity, which is calculated based upon the vehicle speed pulses and the GPS information, the first estimated value and the first parameter; the second learner, started up with the predetermined second timing, reads, at startup, an initial value for the second estimated value and an initial value for the second parameter, which are stored in advance, and starts execution of update processing to update the second estimated value and the second parameter based upon the measurement quantity, which is calculated based upon the vehicle speed pulses and the GPS information, the initial value for the second estimated value and the initial value for the second parameter; and the difference calculation unit calculates the difference between the second estimated value output after a predetermined length of time elapses following startup of the second learner and the first estimated value.

According to the 3rd aspect of the present invention, it is preferred that in the distance factor learning device according to the 2nd aspect, the first learner and the second learner adopt an algorithm whereby the first parameter and the second parameter each converge after a predetermined length of time elapses following startup of each of the first learner and the second learner; and at a time point corresponding to the predetermined second timing, the first parameter is smaller than the second parameter.

According to the 4th aspect of the present invention, it is preferred that in the distance factor learning device according to the 1st aspect, the first learner and the second learner are each a learner that determines a current first estimated value or a current second estimated value for the distance factor, based upon the first estimated value or the second estimated value previously calculated for the distance factor, current vehicle speed pulses and current GPS information, so that the first parameter or the second parameter takes a smallest value.

According to the 5th aspect of the present invention, it is preferred that in the distance factor learning device according to the 1st aspect, the first learner and the second learner are each a Kalman filter and the first parameter and the second parameter each represent error variance in the first estimated value or the second estimated value for the distance factor.

According to the 6th aspect of the present invention, it is preferred that in the distance factor learning device according to the 2nd aspect, the distance factor learning device is installed in a vehicle, the predetermined first timing is timing with which an ignition switch in the vehicle is turned off and the predetermined second timing is timing with which the ignition switch in the vehicle is turned on.

According to the 7th aspect of the present invention, a distance factor learning method for calculating an estimated value for a distance factor based upon a distance between a plurality of current positions obtained from GPS information, a number of vehicle speed pulses obtained while the distance is traveled, and a parameter which is a error index of the estimated value for the distance factor, and that is adopted in a current position calculation device that calculates a current position based upon the estimated value for the distance factor, comprises: updating a first estimated value for the distance factor and a first parameter based upon a measurement quantity, which is calculated based upon the vehicle speed pulses and the GPS information, the first estimated value for the distance factor and the first parameter; updating a second estimated value for the distance factor and a second parameter are updated based upon the measurement quantity, which is calculated based upon the vehicle speed pulses and the GPS information, the second estimated value and the second parameter; calculating a difference between the first estimated value and the second estimated value; and overwriting the first parameter and the first estimated value having been updated with the second parameter and the second estimated value having been updated when the difference between the first estimated value and the second estimated value, having been calculated, is equal to or greater than a predetermined value.

Advantageous Effect of Invention

According to the present invention, a distance factor can be estimated promptly in a stable manner in a limited storage space.

BRIEF DESCRIPTION OF DRAWINGS

FIG. 1 A block diagram showing the structures of a distance factor learning device and a current position calculation device FIG. 2 A flowchart pertaining to an embodiment FIG. 3 Time charts pertaining to the embodiment

DESCRIPTION OF EMBODIMENT

The following is a description of an embodiment of the distance factor learning device according to the present invention, given in reference to FIGS. 1 through 3.

As shown in FIG. 1, a distance factor learning device 1 according to the present invention may be installed in, for instance, a control circuit 100 of a car navigation system so as to function as an auxiliary device for the car navigation system. The control circuit 100 in the car navigation system includes a CPU that executes calculation and a RAM where a program is loaded and data are saved, and processing executed by the distance factor learning device 1 and a current position calculation device 2 is realized via the CPU and the RAM. The structure of the distance factor learning device achieved in the embodiment will be explained first.

While numerous electronic devices are connected to the control circuit 100, only a GPS receiver 20 and a vehicle speed sensor 30, signals from which are received at the distance factor learning device 1 and the current position calculation device 2, are shown in FIG. 1. It is to be noted that a continuous learning unit 11, a one-time learning unit (an each-time learning unit) 12, a factor comparing unit 13, an arithmetic operation control unit 14 and a current position estimating unit 50 included in the distance factor learning device 1 and the current position calculation device 2, provide conceptual diagrams of the functions thereof.

The current position calculation device 2 includes the distance factor learning device 1 and the current position estimating unit 50. The distance factor learning device 1 includes the continuous learning unit 11, the one-time learning unit 12, the factor comparing unit 13, the arithmetic operation control unit 14 and a storage device 40. The distance factor learning device 1 and the current position calculation device 2 both receive GPS signals and vehicle speed pulses respectively from the GPS receiver 20 and the vehicle speed sensor 30. It is to be noted that the data required for the calculation executed by the continuous learning unit 11, the one-time learning unit 12, the factor comparing unit 13 and the arithmetic operation control unit 14 are saved in the RAM in the car navigation system.

A first estimated distance factor value and a first parameter are held in the continuous learning unit 11. As it receives sensor outputs from the GPS receiver 20 and the vehicle speed sensor 30 after each predetermined time interval, i.e., after a 1 sec interval, it updates the first estimated distance factor value and the first parameter based upon the sensor outputs and the currently held first estimated distance factor value and the first parameter. A term "update calculation" will be used hereafter to refer to this updating operation and also to a similar updating operation executed by the one-time learning unit 12. In addition, in response to an OFF signal output from an ignition key switch (not shown), the continuous learning unit 11 saves the first estimated distance factor value and the first parameter into the storage device 40. Upon receiving an ON signal output from the ignition key switch (not shown), it reads the first estimated distance factor value and the first parameter from the storage device 40 and starts update calculation.

While the one-time learning unit 12 is engaged in an operation similar to that of the continuous learning unit 11, it operates differently when it receives an OFF signal and an ON signal output from the ignition key switch. The one-time learning unit 12, which holds a second estimated distance factor value and a second parameter, does not execute any special operation even if it receives an OFF signal output from the ignition key switch (not shown). However, in response to an ON signal output from the ignition key switch (not shown), it reads a default second estimated distance factor value and a default second parameter saved in the storage device 40 and starts update calculation.

It is to be noted that in the following description, the term "parameter" will be used to refer to either the first parameter or the second parameter unless they need to be distinguished from each other and the term "estimated distance factor value" will be used to refer to either the first estimated distance factor value or the second estimated distance factor value unless they need to be distinguished from each other.

The factor comparing unit 13 compares the first estimated distance factor value held at the continuous learning unit 11 with the second estimated distance factor value held at the one-time learning unit 12, and if the difference between them is equal to or greater than a predetermined value, it overwrites the first estimated distance factor value and the first parameter with the second estimated distance factor value and the second parameter respectively.

The arithmetic operation control unit 14 calculates an estimated distance factor value by controlling the continuous learning unit 11, the one-time learning unit 12 and the factor comparing unit 13 and outputs the estimated distance factor value to the current position estimating unit 50, which is a higher-order system relative to the arithmetic operation control unit 14.

The GPS receiver 20 picks up signals transmitted from GPS satellites and calculates the position (latitude and longitude) at which the GPS receiver 20 is located. Thus, by calculating the positional difference i.e., a latitudinal difference and a longitudinal difference, based upon a plurality of sets of measurement results, the travel distance covered from a given measurement point to the next measurement point can be determined.

The vehicle speed sensor 30 includes a sensor, such as a rotary encoder, that outputs a signal corresponding to the tire rotation rate. The output from the vehicle speed sensor is transmitted to the distance factor learning device 1 via, for instance, a CAN (controller area network). A rotary encoder outputs a vehicle speed pulse each time the tires rotate by a predetermined angle, and accordingly, a travel distance L covered during a given time period can be calculated as expressed in (1) below by dividing the number of vehicle speed pulses PLS output during the time period by a distance factor x.

$$L = PLS \div x \quad (1)$$

In the storage device 40, which includes, for instance, a flash memory, the first estimated distance factor value and the first parameter stored in response to an OFF signal from the ignition switch, the default second estimated distance factor value and second parameter, and a program enabling execution of the processing in the flowchart presented in FIG. 2, are saved.

The current position estimating unit 50 updates a reference position for positional estimation each time the position information is obtained from the GPS receiver 20. It then calculates the extent of displacement having occurred during the period elapsing between the reference position update time point and the current time point based upon the vehicle speed pulses provided by the vehicle speed sensor 30, the distance factor provided by the arithmetic operation control unit 14 and the direction indicated by a gyro sensor. The extent of displacement is calculated as a cumulative travel distance value, and the travel distance is determined by the vehicle speed pulses and the distance factor, as indicated in expression (1).

Next, the operation executed by the distance factor learning device 1 in order to output an estimated distance factor value will be explained.

FIG. 2 presents a flowchart of an operation enabled by a program executed by the arithmetic operation control unit 14, which starts in response to an ON operation at the ignition switch and ends when the ignition switch is turned OFF.

As the ignition switch (not shown) is turned on, the processing in the flowchart presented in FIG. 2 is started by the arithmetic operation control unit 14.

In step S10, the arithmetic operation control unit 14 starts up the continuous learning unit 11 so as to have the first estimated distance factor value and the first parameter saved in the storage device 40 read into the continuous learning unit 11, and then the operation proceeds to step S20. The first estimated distance factor value and the first parameter saved in the storage device 40 were read from the continuous learning unit 11 and saved in the storage device 40 when the ignition switch was turned off previously, as will be explained later. Accordingly, once the processing in step S10 is completed, the continuous learning unit 11 is restored to a state matching the state assumed when the ignition switch was previously turned off.

In step S20, the arithmetic operation control unit 14 starts up the one-time learning unit 12 so as to have the default second estimated distance factor value and the default second parameter saved in the storage device 40 read into the one-time learning unit 12, and then the operation proceeds to step S30. Unlike in the processing executed in step S10, the default values are read in step S20, and thus, the one-time learning unit 12 is restored into a default state each time the ignition switch is turned on.

In step S30, the continuous learning unit 11 and the one-time learning unit 12 are engaged in update calculation based upon a measurement quantity z (t) input thereto from the GPS receiver 20 and the vehicle speed sensor 30, and then the operation proceeds to step S40. It is to be noted that when the processing in step S30 is executed for the first time immediately after the ignition switch is turned on, update calculation is executed over a predetermined time length so as to allow time for the output of the one-time learning unit 12 to stabilize, before the operation proceeds to step S40. The time intervals over which the GPS receiver 20 provides an output are longer than the time intervals over which the vehicle speed sensor 30 provides an output. Accordingly, the parameters in the continuous learning unit 11 and the one-time learning unit 12 are updated as indicated in (11) by counting the outputs (vehicle speed pulses) from the vehicle speed sensor in reference to the time intervals over which the GPS receiver 20 provides an output.

In step S40, the arithmetic operation control unit 14 makes a decision as to whether or not the ignition switch is in an OFF state. If it is decided that the ignition switch is in the OFF state, the operation proceeds to step S120, whereas if the ignition switch has remained in the ON state and thus it is not decided that the ignition switch is in the OFF state, the operation proceeds to step S50.

In step S50, the arithmetic operation control unit 14 starts up the factor comparing unit 13 to compare the first estimated distance factor value and the second estimated distance factor value having been updated in step S30. The factor comparing unit 13 makes a decision as to whether or not the absolute value of the difference between the two estimated distance factor values is greater than a predetermined value and if it is decided that the absolute value is greater than the predetermined value, the operation proceeds to step S70, whereas if the absolute value is equal to or less than the predetermined value, the operation proceeds to step S60.

In step S60, the arithmetic operation control unit 14 outputs the first estimated distance factor value as a distance factor to the current position estimating unit 50, which is a higher-order system, before the operation returns to step S30. The processing in the loop from step S30 through step S60 is continuously executed until the ignition switch is turned off (step S40: YES) or until the absolute value of the difference between the two estimated distance factor values becomes greater than the predetermined value (step S50: YES).

In step S70, the arithmetic operation control unit 14 overwrites the first estimated distance factor value and the first parameter value in the continuous learning unit 11 with the second estimated distance factor value and the second parameter in the one-time learning unit 12, and then the operation proceeds to step S80. It is to be noted that since the calculation results provided by the continuous learning unit 11 and the one-time learning unit 12 through subsequent processing would be identical, the one-time learning unit 12 will no longer be engaged in calculation beyond this point.

In step S80, the arithmetic operation control unit 14 outputs the first estimated distance factor as the distance factor and then the operation proceeds to step S90. In step S90, the continuous learning unit 11 updates the first estimated distance factor value and the first parameter based upon the sensor inputs provided from the GPS receiver 20 and the vehicle speed sensor 30, before the operation proceeds to step S100.

In step S100, the arithmetic operation control unit 14 makes a decision, as in step S40, as to whether or not the ignition switch is in the OFF state. If it is decided that the ignition switch is in the OFF state, the operation proceeds to step S120, whereas if the ignition switch has remained in the ON state and thus it is not decided that the ignition switch is in the OFF state, the operation proceeds to step S110.

In step S110, the arithmetic operation control unit 14 outputs the first estimated distance factor value as the distance factor to the higher-order current position estimating unit 50, as in step S60, before the operation returns to step S90. The processing in the loop from step S90 through step S110 is continuously executed until the ignition switch is turned off (step S100: YES).

In step S120, the arithmetic operation control unit 14 saves the first estimated distance factor value and the first parameter at the continuous learning unit 11 into the storage device 40 before ending the processing executed as shown in the flowchart presented in FIG. 2.

Next, in reference to the time charts provided in FIG. 3, changes in the parameters and the estimated distance factor values held at the continuous learning unit 11 and the one-time learning unit 12 will be explained. It is to be noted that FIGS. 3(a) through 3(d) are provided simply to facilitate the explanation of the conditions and that the data in FIGS. 3(e) through 3(g) alone are relevant to the operations executed in the continuous learning unit 11 and the one-time learning unit 12 in the embodiment.

In the time charts presented in FIGS. 3(a) through 3(g), time elapses from the left side toward the right side, and time points are synchronized through all the time charts. Namely, each of time points t0 through t3 indicated by the dotted lines is the same time point through the graphs in FIG. 3(a) through FIG. 3(g).

The ignition switch is turned on to start a traveling operation at the time point to, the vehicle stops traveling and the ignition switch is turned off at the time point t2, and the ignition switch is turned on again to start a traveling operation at the time point t3.

An explanation is first given in reference to FIGS. 3(a) through 3(g).

FIG. 3(a) indicates a cumulative travel distance, which increases monotonically while the vehicle is in a traveling state, i.e., between the time point t0 and the time point t2 and following the time point t3, but remains unchanged while the vehicle is in a stationary state between the time point t2 and the time point t3.

FIG. 3(b) indicates vehicle speed pulses output from the vehicle speed sensor 30, which outputs vehicle speed pulses only while the vehicle is in a traveling state. While the time intervals over which the vehicle speed pulse is output change as the vehicle speed changes, FIG. 3(b) indicates that the vehicle speed pulse is output over constant time intervals since there is no significant change in the vehicle speed.

FIG. 3(c) indicates the timing with which position information is output by the GPS receiver 20. Since the continuous learning unit 11 and the one-time learning unit 12 become engaged in the update calculation upon obtaining the position information, the data output timing indicated in FIGS. 3(e) through 3(g) is synchronous with the position information output timing indicated in FIG. 3(c).

FIG. 3(d) indicates whether the ignition switch is in an ON state or in the OFF state.

FIG. 3(e) indicates the first estimated distance factor value and the first parameter value held at the continuous learning unit 11 respectively with the triangle markers and with the square markers.

FIG. 3(f) indicates the second estimated distance factor value and the second parameter value held at the one-time learning unit 12 respectively with the triangle markers and with the square markers.

FIG. 3(g) indicates the absolute value of the difference between the first estimated distance factor value and the second estimated distance factor value. This graph is used in the decision-making executed in step S50 in FIG. 2. It is to be noted that over the predetermined length of time immediately after the ignition switch is turned on, the difference between the first estimated distance factor value and the second estimated distance factor value is not calculated while waiting for the output from the one-time learning unit 12 to become stabilized. In FIG. 3(g), the absolute values of the difference between the first estimated distance factor value and the second estimated distance factor value calculated by using the output from the one-time learning unit 12 during this predetermined time length are each indicated by a dotted line marker. Namely, the values indicated by the dotted line markers are not used in the decision-making executed in step S50 in FIG. 2.

Changes occurring in the parameters and the estimated distance factor values at the continuous learning unit 11 and the one-time learning unit 12 will be explained next.

As the ignition switch is turned on at the time point to, the first estimated distance factor value and the first parameter saved in the storage device 40 are read into the continuous learning unit 11 (step S10 in FIG. 2). These values were read from the continuous learning unit 11 and saved when the ignition switch was turned off most recently. In addition, the default second estimated distance factor value and the default second parameter saved in the storage device 40 are read into the one-time learning unit 12 (step S20 in FIG. 2).

Following the time point t0, the update calculation is executed each time position information is output by the GPS receiver 20 and thus, the first estimated distance factor value, the first parameter, the second estimated distance factor value and the second parameter are updated (step S30 in FIG. 2). Once the predetermined length of time elapses following the ON operation at the ignition switch, the absolute value of the difference between the first estimated distance factor value and the second estimated distance factor value is calculated (step S50 in FIG. 2) and outputs are provided as indicated by the solid line markers in FIG. 3(g).

The absolute value of the difference between the first estimated distance factor value and the second estimated distance factor value calculated at the time point t1 is greater than the predetermined value (step S50: YES in FIG. 2), and accordingly, the first estimated distance factor value and the first parameter at the continuous learning unit 11 are overwritten with the second estimated distance factor value and the second parameter at the one-time learning unit 12 (step S70 in FIG. 2). FIG. 3(e) simply indicates the second estimated distance factor value and the second parameter prior to the overwrite. In addition, until the ignition switch is turned back on, subsequent update calculation at the one-time learning unit 12 is suspended.

Following the time point t1, the continuous learning unit 11 executes update calculation (step S90 in FIG. 2) so as to update the first estimated distance factor value and the first parameter having been overwritten with the values at the one-time learning unit 12 at the time point t1. The ignition switch is turned off at the time point t2 (step S100: YES in FIG. 2), and the first estimated distance factor value and the first parameter at the continuous learning unit 11 are saved into the storage device 40 as in step S120 in FIG. 2.

As the ignition switch is turned on again at the time point t3, the first estimated distance factor value and the first parameter having been saved into the storage device 40 at the time point t2 are read into the continuous learning unit 11. The default second estimated distance factor value and the default second parameter saved in the storage device 40 are read into the one-time learning device 12 (step S20 in FIG. 2) as at the time point t0. Subsequently, the update calculation is executed each time position information is output by the GPS receiver 20 and thus, the first estimated distance factor value, the first parameter, the second estimated distance factor value and the second parameter are updated (step S30 in FIG. 2).

Next, the update calculation executed by the continuous learning unit 11 and the one-time learning unit 12 will be described.

As explained earlier, the continuous learning unit 11 and the one-time learning unit 12 execute identical update calculations, so as to determine the current estimated values each achieving a smallest error index, based upon the preceding estimated value and a sensor information measurement quantity calculated by taking into consideration factors such as disturbance. In the embodiment, the update calculation is executed through a learner that minimizes the error index, such as the Kalman filter, which uses the mean square of the error as the error index.

An error in the measurement quantity, attributable to a disturbance in the vehicle speed pulse train and a fluctuation in the GPS signal, is estimated as a standard deviation σ, the estimated standard deviation σ is incorporated in the process of estimating the distance factor x(t), and the distance factor is continuously estimated by taking into consideration errors related to the GPS signals and the vehicle speed sensor. The measurement quantity z(t) is calculated as expressed in (2), expression (3) is a state equation and expression (4) is an observation equation.

$$z(t)=PLS/L_{GPS} \tag{2}$$

PLS represents the number of vehicle speed pulses output during the corresponding time period, whereas $L_{GPS}$ indicates the travel distance covered over a given time length calculated based upon GPS signals.

$$x(t)=x(t-1) \tag{3}$$

x(t) is the distance factor at the time point t.

$$z(t)=x(t)+R(t) \tag{4}$$

R(t) represents variance at the time point t.

The relationship between variance R(t) and the standard deviation a representing the measurement quantity error is expressed in (5) below.

$$R(t)=\sigma^2 \tag{5}$$

With the Kalman filter, an estimated value is predicted as expressed in (6) and (7).

$$\hat{x}(t|-1)=\hat{x}(t-1|t-1) \tag{6}$$

$\hat{x}(t|t-1)$ represents the estimated distance factor value for the time point t, predicted based upon the measurement value and the state equation corresponding to a time point t−1.

$$P(t|t-1)=P(t-1|t-1) \tag{7}$$

The estimated value is updated through the Kalman filter as expressed in (8) through (11) below.

$$e(t)=z(t)-\hat{x}(t|t-1) \tag{8}$$

e(t) represents observation residuals.

$$K(t)=P(t)(P(t)+R(t))^{-1} \tag{9}$$

K(t) represents the learning gain.

$$\hat{x}(t|t)=\hat{x}(t|t-1)+K(t)e(t) \tag{10}$$

$\hat{x}(t|t)$ represents the estimated distance factor value.

$$P(t|t)=(1-K(t))P(t|t-1) \tag{11}$$

P(t|t) represents the error variance.

The update calculation is executed at the continuous learning unit 11 and the one-time learning unit 12 as explained above.

The first estimated distance factor value and the first parameter at the continuous learning unit 11 are $\hat{x}(t|t)$ and P(t|t) respectively, whereas the second estimated distance factor value and the second parameter at the one-time learning unit 12 are $\hat{x}(t|t)$ and P(t|t) respectively. While a single measurement quantity z(t) is input to the continuous learning unit 11 and the one-time learning unit 12, the estimated distance factor values and the parameters are read from different locations, as explained earlier, when the ignition switch is turned on, resulting in different values calculated as the estimated distance factor values.

The following advantages and operations are achieved through the embodiment described above.

(1) The distance factor learning device 1, used for a current position calculation device 2 that calculates a current position based upon an estimated value for a distance factor, which is determined based upon a distance between a plurality of current positions obtained from a GPS receiver 20 and the number of vehicle speed pulses obtained while the distance is traveled, and a parameter, comprises a continuous learning unit 11 that updates a first estimated distance factor value estimated for the distance factor and a first parameter based upon a measurement quantity calculated, which is calculated based upon the vehicle speed pulses and the output from the GPS receiver 20, the first estimated distance factor value and the first parameter, a one-time learning unit 12 that updates, a second estimated distance factor value estimated for the distance factor and a second parameter based upon measurement quantity, which is calculated based upon the vehicle speed pulses and the output from the GPS receiver 20, the second estimated distance factor value and the second parameter, a difference calculation unit, i.e., a factor comparing unit 13, that calculates a difference between the first estimated distance factor value and the second estimated distance factor value, and an arithmetic operation control unit 14 that overwrites the first parameter and the first estimated distance factor value at the continuous learning unit 11 with the second parameter and the second estimated distance factor value at the one-time learning unit 12 when the difference between the first estimated distance factor value and the second estimated distance factor value having been calculated is equal to or greater than a predetermined value.

Thus, while the vehicle speed pulses and the output from the GPS receiver 20 are continuously input during distance factor calculation, the estimated distance factor values and parameters are simply updated without accumulating the vehicle speed pulses or the output from the GPS receiver 20, making it possible to estimate the distance factor within a limited storage space. In addition, since the continuous learning unit 11 and the one-time learning unit 12 individually estimate values for the distance factor and the parameter and the like at the continuous learning unit 11 are overwritten with the parameter and the like at the one-time learning unit 12 when the difference between the two estimated values is equal to or greater than the predetermined value, the distance factor can be estimated by taking advantage of the different characteristics of the two learners.

(2) The distance factor learning device 1 includes a storage unit that stores the first estimated distance factor value and the first parameter calculated by the continuous learning unit 11 with timing with which the ignition switch is turned off. As the continuous learning unit 11 is started up with the timing with which the ignition switch is turned on, it reads, at start up, the first estimated distance factor value and the first parameter having been stored with the timing with which the ignition switch was last turned off and starts update processing to update the first estimated distance factor value estimated for the distance factor and the first parameter, based upon a measurement quantity, which is calculated based upon vehicle speed pulses and an output from the GPS receiver 20, the first estimated distance factor value and the first parameter. As the one-time learning unit 12 is started up with the timing with which the ignition switch is turned on, it reads, at start up, an initial value for the second estimated distance factor value and an initial value for the second parameter stored in advance and starts update processing so as to update the second estimated distance factor value and the second parameter based upon the measurement quantity, which is calculated based upon the vehicle speed pulses and the output from the GPS receiver 20, the initial value for the second estimated distance factor value and the initial value for the second parameter. The difference calculation unit, i.e., the factor comparing unit 13, calculates the difference between the second estimated distance factor value and the first estimated distance factor value output after a predetermined length of time elapses following startup of the one-time learning unit 12.

This means that as the ignition switch is turned on, the continuous learning unit 11 is restored to the state having been assumed when the ignition switch was turned off and thus, is able to estimate the distance factor in a stable manner. In addition, the factor comparing unit 13 compares the second estimated distance factor value with the first estimated distance factor value when a predetermined length of time has elapsed following startup of the one-time learning unit 12 and the second estimated distance factor value output by the one-time learning unit 12 has become stabilized, thereby assuring stability in the estimation of the distance factor.

Furthermore, the one-time learning unit 12, assuring good response to the measurement quantity, is able to more quickly reflect the measurement quantity in the distance factor estimation in comparison to the continuous learning unit 11, even if, for instance, the distance factor learning device 1 is connected to a different vehicle or the tires are replaced, resulting in a significant change in the distance factor, while the ignition switch is in the OFF state. Under such circumstances, if the difference between the first estimated distance factor value and the second estimated distance factor value is equal to or greater than the predetermined value, the parameter and the like at the continuous learning unit 11 are overwritten with the parameter and the like at the one-time learning unit 12 and thus, the distance factor can be quickly estimated by selecting an optimal threshold value.

(Variation 1)

While the learning device in the embodiment described above is engaged in learning regardless of the speed of the mobile object in which the learning device is installed, it may be instead engaged in learning only when the speed is equal to or higher than a predetermined speed, since the error in GPS position detection (i.e., the offset relative to the true position) remains constant regardless of the traveling speed and thus, the relative error in the measurement quantity $z(t)$ becomes greater at lower traveling speed.

Variation 1, in which a measurement quantity $z(t)$ with a significant error is not used in the distance factor calculation, is advantageous in that the error in the estimated distance factor is reduced.

(Variation 2)

While the distance factor learning device 1 achieved in the embodiment described above is a vehicle-mounted terminal, it may instead be configured with a portable terminal. However, the vehicle speed sensor 30 cannot be installed in the distance factor learning device 1 configured with a portable terminal and accordingly, the distance factor learning device 1 needs to execute arithmetic operations based upon vehicle speed signals received from a vehicle-mounted vehicle speed sensor through wireless communication. Such wireless communication may be enabled via a converter capable of rendering, for instance, a CAN wireless.

Variation 2 allows the present invention to be adopted in conjunction with various types of terminals.

(Variation 3)

While the continuous learning unit 11 and the one-time learning unit 12 in the embodiment described above execute the update calculation by using a Kalman filter, the present invention is not limited to this example. The update calculation may be executed through any method, e.g., a least-square estimation, as long as a current estimated value is determined so as to minimize the error index based upon the previous estimated value and a measurement quantity calculated based upon sensor information that carries a disturbance.

The embodiment and variations thereof described above may be adopted in any combination. In addition, as long as the features characterizing the present invention are not compromised, the present invention is in no way limited to the particulars of the embodiments described above.

The disclosure of the following priority application is herein incorporated by reference:

Japanese Patent Application No. 2013-248347, filed Nov. 29, 2013

REFERENCE SIGNS LIST

1 . . . distance factor learning device, 2 . . . current position calculation device, 10 . . . distance factor learning unit, 11 . . . continuous learning unit, 12 . . . one-time learning unit, 13 . . . factor comparing unit, 14 . . . arithmetic operation control unit, 20 . . . GPS receiver, 30 . . . vehicle speed sensor, 40 . . . storage device, 50 . . . current position estimating unit

The invention claimed is:

1. A distance factor learning device that calculates an estimated value for a distance factor based upon a distance between a plurality of current positions obtained from GPS information, a number of vehicle speed pulses obtained while the distance is traveled, and a parameter which is an error index of the estimated value for the distance factor, and that is used for a current position calculation device that calculates a current position based upon the estimated value for the distance factor, comprising:
 a continuous learning unit that updates a first estimated value for the distance factor and a first parameter, based upon
  a measurement quantity, which is calculated based upon the vehicle speed pulses and the GPS information,
  the first estimated value for the distance factor and the first parameter;
 a one-time learning unit that updates a second estimated value for the distance factor and a second parameter, based upon,
  the measurement quantity,
  the second estimated value for the distance factor and the second parameter;
 a factor comparing unit that calculates absolute value of the difference between the updated first estimated value and the updated second estimated value;
 an arithmetic operation control unit that overwrites the first parameter and the first estimated value at the continuous learning unit with the second parameter and the second estimated value at the one-time learning unit when the difference between the updated first estimated value and the updated second estimated value, having been calculated, is equal to or greater than a predetermined value; and
 a storage unit in which the first estimated value and the first parameter calculated by the continuous learning unit are stored with predetermined first timing, wherein:
 both of the continuous learning unit and the one-time learning unit are a Kalman filter or a least-square estimator that determines the updated first estimated value or the updated second estimated value for the distance factor, based upon the first estimated value or the second estimated value previously calculated for the distance factor, current vehicle speed pulses and current GPS information, so that a value of the first parameter or the second parameter is reduced;
 the continuous learning unit, started up with predetermined second timing, reads, at startup, the first estimated value and the first parameter having been stored with the predetermined first timing and starts execution of update processing to update the first estimated value and the first parameter based upon the measurement quantity, which is calculated based upon the vehicle speed pulses and the GPS information, the first estimated value and the first parameter;
 the one-time learning unit, started up with the predetermined second timing, reads, at startup, an initial value for the second estimated value and an initial value for the second parameter, which are stored in advance, and starts execution of update processing to update the second estimated value and the second parameter based upon the measurement quantity, which is calculated based upon the vehicle speed pulses and the GPS information, the initial value for the second estimated value and the initial value for the second parameter;
 the difference calculation unit calculates the difference between the second estimated value output after a predetermined length of time elapses following startup of the one-time learning unit and the first estimated value; and
 the distance factor learning device is installed in a vehicle, the predetermined first timing is timing with which an ignition switch in the vehicle is turned off and the predetermined second timing is timing with which the ignition switch in the vehicle is turned on.

2. The distance factor learning device according to claim 1, wherein:
 the continuous learning unit and the one-time learning unit adopt an algorithm whereby the first parameter and the second parameter each converge after a predetermined length of time elapses following startup of each of the continuous learning unit and the one-time learning unit; and
 at a time point of the ignition switch in the vehicle being turned on, the first parameter is smaller than the second parameter.

3. The distance factor learning device according to claim 1, wherein:
 the continuous learning unit and the one-time learning unit are Kalman filters and the first parameter and the second parameter each represent error variance in the first estimated value or the second estimated value for the distance factor.

4. A distance factor learning method for calculating an estimated value for a distance factor based upon a distance between a plurality of current positions obtained from GPS information, a number of vehicle speed pulses obtained while the distance is traveled, and a parameter which is an error index of the estimated value for the distance factor, and that is adopted in a current position calculation device that calculates a current position based upon the estimated value for the distance factor, comprising:
 updating, by a continuous learning unit that is a Kalman filter or a least-square estimator, a first estimated value for the distance factor and a first parameter based upon
  a measurement quantity, which is calculated based upon the vehicle speed pulses and the GPS information,
  the first estimated value for the distance factor and the first parameter;
 updating, by a one-time learning unit that is a Kalman filter or a least-square estimator, a second estimated value for the distance factor and a second parameter based upon
  the measurement quantity,
  the second estimated value and
  the second parameter;
 calculating a difference between the first estimated value and the second estimated value; and
 overwriting, with a predetermined first timing, the first parameter and the first estimated value having been updated with the second parameter and the second estimated value having been updated when the difference between the first estimated value and the second estimated value, having been calculated, is equal to or greater than a predetermined value; wherein
 the continuous learning unit and the one-time learning unit determine a current first estimated value or a current second estimated value for the distance factor, based upon the first estimated value or the second estimated value previously calculated for the distance factor, current vehicle speed pulses and current GPS information, so that a value of the first parameter or the second parameter is reduced;

the continuous learning unit and the one-time learning unit determine the updated first estimated value or the updated second estimated value for the distance factor, based upon the first estimated value or the second estimated value previously calculated for the distance factor, current vehicle speed pulses and current GPS information, so that a value of the first parameter or the second parameter is reduced;

the continuous learning unit, started up with predetermined second timing, reads, at startup, the first estimated value and the first parameter having been stored with the predetermined first timing and starts execution of update processing to update the first estimated value and the first parameter based upon the measurement quantity, which is calculated based upon the vehicle speed pulses and the GPS information, the first estimated value and the first parameter;

the one-time learning unit, started up with the predetermined second timing, reads, at startup, an initial value for the second estimated value and an initial value for the second parameter, which are stored in advance, and starts execution of update processing to update the second estimated value and the second parameter based upon the measurement quantity, which is calculated based upon the vehicle speed pulses and the GPS information, the initial value for the second estimated value and the initial value for the second parameter;

the difference calculation unit calculates the difference between the second estimated value output after a predetermined length of time elapses following startup of the one-time learning unit and the first estimated value; and the distance factor learning device is installed in a vehicle, the predetermined first timing is timing with which an ignition switch in the vehicle is turned off and the predetermined second timing is timing with which the ignition switch in the vehicle is turned on.

* * * * *